United States Patent
Guinard et al.

(10) Patent No.: US 11,068,761 B2
(45) Date of Patent: Jul. 20, 2021

(54) DYNAMIC PRODUCT TAG BASED ON AN ENVIRONMENTAL CONDITION

(71) Applicant: EVRYTHNG Ltd, London (GB)

(72) Inventors: Dominique Guinard, Yverdon-les-Bains (CH); Joel Vogt, Commungy (CH); Niall Murphy, London (GB); Iker Larizgoitia Abad, London (GB); Shmuel Silverman, Novato, CA (US)

(73) Assignee: Evrythng Ltd., London (GB)

( * ) Notice: Subject to any disclaimer, the term of this patent is extended or adjusted under 35 U.S.C. 154(b) by 0 days.

(21) Appl. No.: 16/712,974

(22) Filed: Dec. 12, 2019

(65) Prior Publication Data

US 2020/0193252 A1    Jun. 18, 2020

Related U.S. Application Data

(60) Provisional application No. 62/779,033, filed on Dec. 13, 2018.

(51) Int. Cl.
*G06Q 30/00* (2012.01)
*G06K 19/06* (2006.01)
(Continued)

(52) U.S. Cl.
CPC ... *G06K 19/06037* (2013.01); *G06F 16/9566* (2019.01); *G06Q 10/087* (2013.01); *G06K 19/06028* (2013.01)

(58) Field of Classification Search
CPC ......... G06F 16/9566; G06K 19/06028; G06K 19/06037; G06Q 10/087
See application file for complete search history.

(56) References Cited

U.S. PATENT DOCUMENTS 9,221,273 B1 * 12/2015 Hyde ................... B44F 1/08
2011/0140857 A1 * 6/2011 Hull ................... G06K 7/10356
340/10.1

(Continued)

OTHER PUBLICATIONS

Biosensing by "Growing" Antennas and Error-Correcting Code Yuan, Mingquan. ProQuest Dissertations and Theses ProQuest Dissertations Publishing. (2018) (Year: 2018).*

*Primary Examiner* — Thien M Le
(74) *Attorney, Agent, or Firm* — Steven Stupp

(57) ABSTRACT

A computer that generates a product tag for a product is described. During operation, the computer may obtain information specifying multiple document locations associated with the product based at least in part on different environmental conditions of the product. Then, the computer may generate the product tag (or additional information specifying the product tag), where the product tag includes location information specifying the document locations. Moreover, given location information is associated with a given functional ink or is associated with a given state of a circuit in the product tag that is responsive to a given environmental condition. Furthermore, the environmental conditions for different functional inks or different states of the circuit are different, such that, at a given time, the product tag presents location information for a given one of the document locations. Next, the computer may provide the additional information specifying the product tag to the electronic device.

20 Claims, 10 Drawing Sheets

(51) Int. Cl.
*G06Q 10/08* (2012.01)
*G06F 16/955* (2019.01)

(56) References Cited

U.S. PATENT DOCUMENTS

| | | | | |
|---|---|---|---|---|
| 2014/0068422 | A1* | 3/2014 | Rajkumar | G06F 40/20 |
| | | | | 715/243 |
| 2014/0365900 | A1* | 12/2014 | Chu | G06F 16/9554 |
| | | | | 715/738 |
| 2015/0019444 | A1* | 1/2015 | Purves | G06Q 20/3821 |
| | | | | 705/76 |
| 2015/0039986 | A1* | 2/2015 | Thomas | G06F 40/174 |
| | | | | 715/221 |
| 2015/0213734 | A1* | 7/2015 | Glickman | G09F 3/005 |
| | | | | 235/494 |
| 2019/0156079 | A1* | 5/2019 | Espinosa | G06K 19/0717 |

\* cited by examiner

DYNAMIC PRODUCT TAG BASED ON AN ENVIRONMENTAL CONDITION

CROSS-REFERENCE TO RELATED APPLICATION

This application claims priority to U.S. Provisional Application Ser. No. 62/779,033, entitled "Environment Sensitive Web Identities in Barcodes," by Dominique David Guinard, et al., filed Dec. 13, 2018, the contents of which are hereby incorporated by reference.

BACKGROUND

Field

The described embodiments relate to smart packaging and, in particular, to techniques that vary information on or associated with a product based at least in part on sensory capabilities of inks and materials in a product tag, label or package.

Related Art

Consumer goods or products often include or have product tags or labels with information. Typically, the information included in a product tag is static. Thus, once a product tag is printed, the information it contains usually cannot be changed.

In order to make product tags more response, some product tags use inks that react to changes in the environment. For example, photochromic inks may react to light changes, thermochromic inks may react to temperature changes, and hydrochromic inks may react to changes in humidity. These inks are sometimes referred to as sensing, functional or interactive inks. (In the discussion that follows, an ink that respond or change a physical property, such as an optical property, in response to a change in one or more environmental conditions is referred to as a 'functional ink'.) While functional inks allow the appearance of a label (e.g., its colors) or the written content in some product tags to be changed, the type of variation is typically qualitative and is often very limited.

SUMMARY

A computer that generates a product tag for a product is described. This computer may include: a network interface that communicates with an electronic device (such as a printer, which may be remotely located from the computer); a processor; and memory that stores program instructions. During operation, the computer may obtain information specifying multiple document locations associated with the product based at least in part on different environmental conditions of the product. Then, the computer may generate the product tag, where the product tag includes location information specifying the document locations, given location information is associated with at least a given functional ink or is associated with a given state of a circuit in the product tag that is responsive to a given environmental condition, and the environmental conditions for different functional inks or different states of the circuit are different, such that, at a given time, the product tag presents location information for a given one of the document locations. Next, the computer may provide additional information specifying the product tag to the electronic device.

In some embodiments, the additional information includes an identifier of the product tag or an instance of the product. By changing the identifier, a new product tag or a different instance of the product may be specified.

Note that the document locations may correspond to documents (such as web pages or websites). Alternatively or additionally, the document locations may include uniform resource locations (URLs) and/or uniform resource identifiers (URIs).

Moreover, the location information may include barcodes, such as two-dimensional (2D) barcodes. For example, the 2D barcodes may include Quick Response or QR codes.

Furthermore, presenting location information for the given one of the document locations may include that the location information for the given one of the document locations is visible, while location information for a remainder of the document locations are not visible.

Additionally, the computer may select the location information based at least in part on capabilities of the functional inks (such as environmental responses of the functional inks), the states of the circuit, and/or a type of electronic device that interacts with (such as scans, images or reads out) the product tag.

In some embodiments, obtaining the information may involve accessing the information, which is stored in the memory.

Moreover, in some embodiments, the given functional ink responds to sensor data from a sensor associated with the product or the product tag that specifies the given environmental condition. For example, the product tag may include the sensor that provides the sensor data based at least in part on the given environmental condition and the circuit may activate the given functional ink based at least in part on the sensor data. Alternatively or additionally, the given state of the circuit may be in response to sensor data from the sensor associated with the product or the product tag that specifies the given environmental condition.

Furthermore, the environmental condition may include one or more of: a lighting condition, a light intensity, temperature, humidity, a vibration level, a pollution level, an altitude, a location, a time (such as an elapsed time relative to an expiration date of the product), a noise level, a presence or absence of a biological material (such as a deoxyribonucleic acid or DNA sequence, a ribonucleic acid or RNA sequence or a protein), and/or another environmental condition.

In some embodiments, the environmental condition includes a radio-frequency (RF) signal that is received by the sensor or the circuit. This RF signal may include one or more frequencies and/or may be encoded (and, thus, may be an RF signature that specifically activates the product tag). For example, the RF signal may specify or indicate a code or an identifier associated with the product tag and/or the product. Alternatively or additionally, the RF signal may be associated with a carrier frequency and/or may be compatible with a communication protocol (such as Bluetooth low energy). Moreover, the circuit may provide a voltage that results in the presentation of the given location information based at least in part on the RF signal. For example, when the RF signal is received by the sensor or the circuit, a current in the circuit may cause the voltage to be provided.

Additionally, the location information may include one or more messages (such as a warning message or notification).

Note that the document locations may identify the product, either uniquely or at a level of a stock-keeping unit.

Another embodiment provides a computer-readable storage medium for use with the computer. When executed by the computer, this computer-readable storage medium causes the computer to perform at least some of the aforementioned operations.

Another embodiment provides a method, which may be performed by the computer. This method includes at least some of the aforementioned operations.

Another embodiment provides the product tag.

Another embodiment provides a second electronic device. This second electronic device may obtain information that specifies the product tag for the product. This information may include location information that specifies a document location associated with the product. Then, the second electronic device may extract the document location from the information, and may provide a message that specifies the document location to a computer via a network.

Note that the location information may be based at least in part on an environmental condition of the product. Moreover, in response to the message, the second electronic device may receive product information (and, more generally, content) associated with the product and the environmental condition from the computer. Furthermore, the second electronic device may present the product information.

Alternatively or additionally, in response to the message, the second electronic device may receive an instruction specifying an RF signal from the computer. Then, the second electronic device may provide the RF signal to the product tag in response to the instruction. This RF signal may change the product tag, such that second location information that specifies a second document location associated with the product is presented. Next, the second electronic device may obtain second information that specifies the product tag for the product. This second information may include the second location information that specifies the second document location associated with the product. Then, the second electronic device may extract the second document location from the second information and may provide a second message that specifies the second document location to the computer via the network.

In some embodiments, where the image and/or the second image are obtained by the second electronic device from a separate scanning device, the instruction specifying the RF signal may be provided to the scanning device by the computer. In response to the instruction, the scanning device may provide the RF signal to the product tag instead of the second electronic device.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
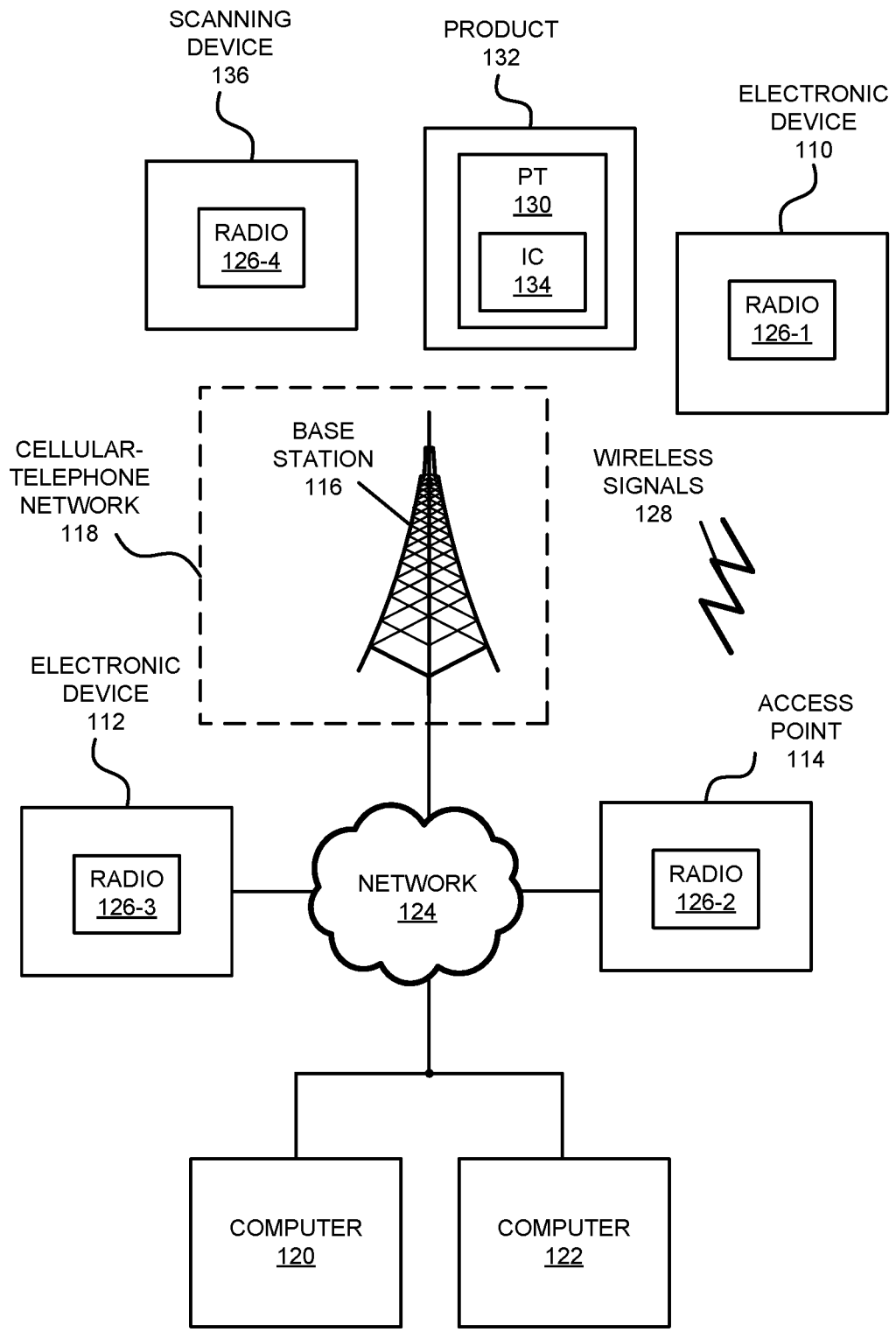
FIG. 1 is a block diagram illustrating an example of communication among electronic devices in accordance with an embodiment of the present disclosure.

A computer that generates a product tag for a product is described. This computer may include: a network interface that communicates with an electronic device (which may be remotely located from the computer); a processor; and memory that stores program instructions. During operation, the computer may obtain information specifying multiple document locations associated with the product based at least in part on different environmental conditions of the product. Then, the computer may generate the product tag (or additional information specifying the product tag), where the product tag includes location information specifying the document locations. Moreover, given location information is associated with at least a given functional ink or is associated with a given state of a circuit in the product tag that is responsive to a given environmental condition. Furthermore, the environmental conditions for different functional inks or different states of the circuit are different, such that, at a given time, the product tag presents location information for a given one of the document locations. Next, the computer may provide the additional information specifying the product tag to the electronic device.

By generating and providing the product tag, these product-information techniques may facilitate a dynamic product tag that provides different location information based at least in part on different environmental conditions. In turn, the document locations represented by the location information may correspond to different product information. Consequently, the dynamic product tag may allow a consumer or a user to access different product information based at least in part on the different environmental conditions. Therefore, the product-information techniques may allow the product tag to be used to provide dynamic product information to the consumer or the user. This dynamic product information may ensure that the content is responsive to and appropriate for a current environmental condition of the product. Thus, the product-information techniques may improve the user experience when purchasing or using the product.

In some embodiments, the product-information techniques may provide the dynamic product information in a centralized or a distributed or decentralized manner. The decentralized embodiments may provide resilience, because the dynamic product information may be stored or maintained in a decentralized network that includes many nodes.

Moreover, in the discussion that follows, electronic devices may communicate packets or frames with wired and/or wireless networks (e.g., via access points, radio nodes or base stations) in accordance with a wired communication protocol (such as an Institute of Electrical and Electronics Engineers or IEEE 802.3 standard, which is sometimes referred to as 'Ethernet', or another type of wired interface) and/or a wireless communication protocol, such as: an IEEE 802.11 standard (which is sometimes referred to as 'Wi-Fi,' from the Wi-Fi Alliance of Austin, Tex.), Bluetooth (from the Bluetooth Special Interest Group of Kirkland, Wash.), a cellular-telephone communication protocol (such as 2G, 3G, 4G, 5G, Long Term Evolution or LTE, another cellular-telephone communication protocol, etc.) and/or another type of wireless interface. In the discussion that follows, Wi-Fi, a cellular-telephone communication protocol and Ethernet are used as an illustrative example. However, a wide variety of communication protocols (such as) may be used. The wireless communication may occur in a variety of frequency bands, such as: a cellular-telephone communication band, a frequency band associated with a Citizens Band Radio Service, a Wi-Fi frequency band (such as a 2.4 GHz, a 5 GHz and/or a 60 GHz frequency band), etc.

FIG. 1 presents a block diagram illustrating an example of communication among one or more of electronic devices 110 and 112 (such as a cellular telephone, a computer, etc., and which are sometimes referred to as 'clients'), access point 114, base station 116 in cellular-telephone network 118, computer 120 and computer 122 in accordance with some embodiments. Access point 114 and base station 116 may communicate with computer 120 and/or computer 122 via network 124 (such as the Internet) using wireless and/or wired communication (such as by using Ethernet or a communication protocol that is compatible with Ethernet), and may communicate with electronic device 110 using wireless communication (Wi-Fi and a cellular-telephone communication protocol, respectively). Note that access point 114 may include a physical access point and/or a virtual access point that is implemented in software in an environment of an electronic device or a computer. In addition, access point 114 and/or base station 116 may communicate with electronic devices 110 using wireless communication, while electronic device 112 may communicate with computer 120 and/or computer 122 via network 124.

While not shown in FIG. 1, the wired and/or wireless communication with electronic devices 110 and/or 112 may further occur via an intra-net, a mesh network, point-to-point connections, etc., and may involve one or more routers and/or switches. Furthermore, the wireless communication may involve: transmitting advertising frames on wireless channels, detecting one another by scanning wireless channels, establishing connections (for example, by transmitting association or attach requests), and/or transmitting and receiving packets or frames (which may include the association requests and/or additional information as payloads). In some embodiments, the wired and/or wireless communication in FIG. 1 also involves the use of dedicated connections, such as via a peer-to-peer (P2P) communication technique.

Figure 10:
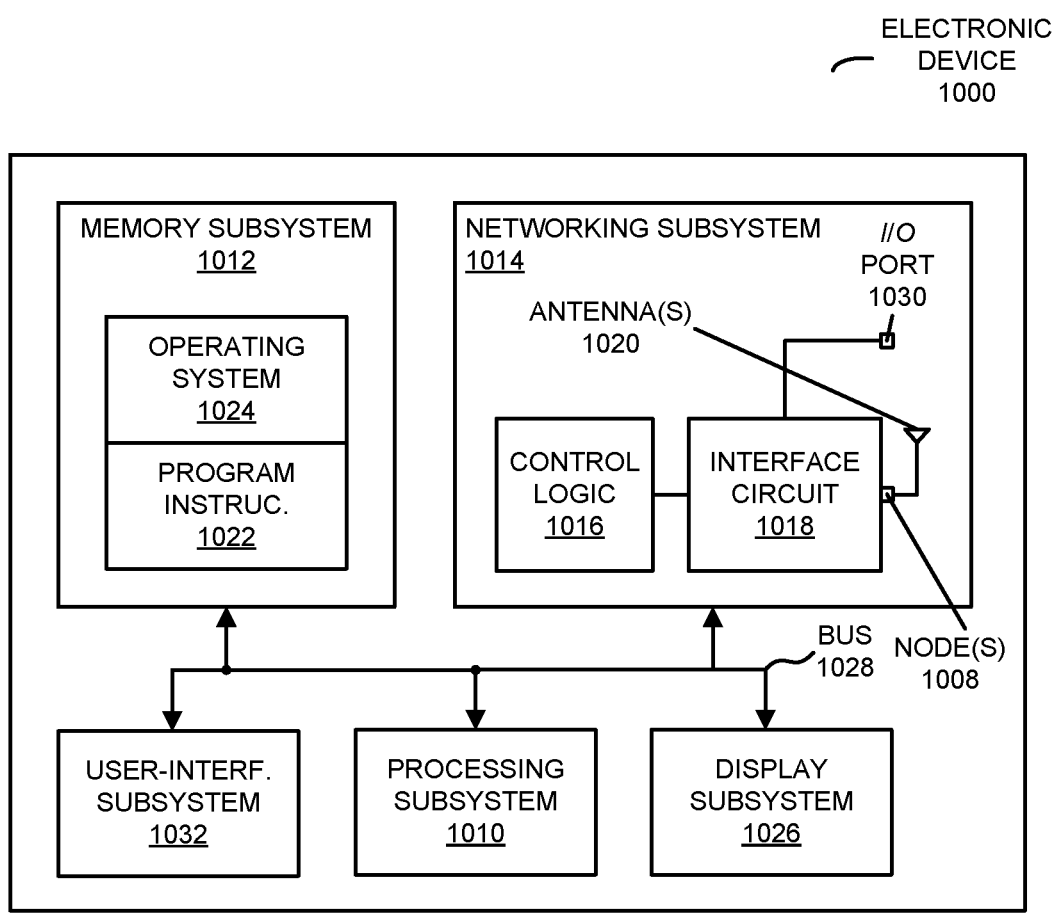
FIG. 10 is a block diagram illustrating an example of an electronic device in accordance with an embodiment of the present disclosure.

As described further below with reference to FIG. 10, electronic device 110, electronic device 112, access point 114, base station 116, computer 120 and/or computer 122 may include subsystems, such as a networking subsystem, a memory subsystem and a processor subsystem. In addition, electronic device 110, access point 114 and base station 116 may include radios 126 in the networking subsystems. More generally, electronic device 110, electronic device 112 and access point 114 can include (or can be included within) any electronic devices with the networking subsystems that enable electronic device 110 and access point 114 to communicate with each other using wireless and/or wired communication. This wireless communication can comprise transmitting advertisements on wireless channels to enable access point 114 and/or electronic device 110 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 126 are shown in electronic device 110 and access point 114, one or more of these instances may be different from the other instances of radios 126.

As can be seen in FIG. 1, wireless signals 128 (represented by a jagged line) are transmitted from radio 126-1 in electronic device 110. These wireless signals may be received by radio 126-2 in access point 114. Notably, electronic device 110 may transmit packets or frames. In turn, these packets or frames may be received by access point 114. Moreover, access point 114 may allow electronic device 110 to communicate with other electronic devices, computers and/or servers via network 124.

Note that the communication among components in FIG. 1 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in electronic device 110 and/or access point 114 includes: receiving signals (such as wireless signals 128) with the packet or frame; decoding/extracting the packet or frame from received wireless signals 128 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, many consumer goods or products often include or have product tags or labels with static information. For example, a product tag may include a 2D barcode, such as a URL, that specifies content on the Internet. When the product tag is scanned or imaged, the URL may provide a document location (such as a web page or a website) with the content. While the use of functional inks in a product tag allow the appearance of a label (e.g., its colors) or the written content to be changed, the type of variation is typically qualitative and is often very limited. Thus, it is typically not possible for a QR code printed on a product or a product tag to dynamically adapt or change in response to a temperature of an environment that includes a product, so that different content can be provided based at least in part on the temperature.

Moreover, some product tags include sensors that can monitor environmental conditions. However, these product tags usually require the use of a dedicated application in order to decode or read the sensor data provided by a sensor. Consequently, the sensor data is typically unavailable or cannot be used to change a product tag. Thus, different content usually cannot be provided based at least in part on different sensor data.

As described further below with reference to FIGS. 2-9, these problems may be addressed by the product-information techniques. Notably, a product tag (PT) 130 in a product 132 may include location information (such as 1D or 2D barcodes, e.g., Data Matrix or QR codes) associated with, corresponding or that encode or specify to multiple document locations, such as uniform resource identifiers or URIs and/or URLs for: different web pages, websites or web services provided by computer 122, different parameters for a common web service, and/or different memory locations with stored content or product information in computer 122. (Note that a 'web service' may refer to a service, e.g., a web page, a website, an application, a web server, etc., offered at one or more locations on a network, such as the Internet.) Moreover, product tag 130 may adapt or change in response to changes in one or more environmental conditions, so that the presented or visible location information changes as the one or more environmental conditions change. In this way, at a given time (for one or more given environmental conditions), given location information associated with or corresponding to a given document location is presented or visible in or on product tag 130.

For example, product tag 130 may include different functional inks (such as interleaved, interdigitated or overlapping functional inks having different properties or characteristics, e.g., a photochromic ink, a thermochromic ink, a hydrochromic ink, an ink that reacts or responds to acid, and/or another functional ink) that are associated with different location information, where the given location information is associated with a given functional ink that responds to given environmental condition(s). Alternatively or additionally, product tag 130 may include an optional circuit (e.g., in an optional integrated circuit or IC 134), where a given state of the circuit is responsive to given environmental condition(s). Moreover, the environmental conditions for different functional inks or different states of the circuit may be different, such that, at a given time, product tag 130 presents location information for a given one of the document locations, while location information for a remainder of the document locations is not presented (e.g., is not visible). Note that the circuit or integrated circuit 134 may be included on a separate substrate or material from product tag 130 or may printed onto product tag 130.

Moreover, a function ink may vary with its environment, changing one or more physical properties back and forth as the one or more environmental conditions change. For example, one or more physical properties of a thermochromic ink may change back and forth with as the temperature changes. In some embodiments, the thermochromic ink may react to or at a particular temperature, e.g., by changing from one color, shade or hue to another color, shade or hue as the temperature reaches the certain temperature, which may make the functional ink visible (or invisible) to a human. This thermochromic ink may change back to the initial color if the temperature subsequently changes. Thus, a functional ink may be used to indicate one or more current environmental conditions. Note that, instead of being such a 'dynamic functional ink', in some embodiments one or more physical properties of a function ink may change once, e.g., when one or more environmental conditions occur, and then may not subsequently vary or change. For a hydrochromic ink may react to a certain degree of humidity (e.g., by changing from one color to another color). However, this hydrochromic ink may not change back to its initial color if the humidity subsequently changes. Therefore, in some embodiments, a functional ink may indicate one or more environmental conditions that existed at least once (and, thus, may provide memory about an environmental history or environment exposures of product 132). This type of function ink is sometimes referred to as a 'one-way functional ink'. In some embodiments, a functional ink may appear (or disappear or fade) over time. Furthermore, a functional ink may be multi-chromatic, such as having two or colors, shades, hues or states that indicate or correspond to different environmental conditions (e.g., different temperatures or ranges of temperatures).

Additionally, in some embodiments, product tag 130 is modified, at least in part, using human interaction or a setup operation. For example, a human or a machine may apply light having a color (such as ultraviolet light) to activate the environmental response of a functional ink. Alternatively or additionally, in some embodiments, a human or a machine may scratch off at least a portion of product tag 130, which may reveal or remove a portion of product tag 130. This modification may change one or more of the location information corresponding to different document locations. For example, product tag 130 may be modified at a particular location or time in a supply chain, such as at a warehouse or at a retail establishment when product 132 is received or is placed on a shelf or in a display case.

In some embodiments, integrated circuit 134 may include one or more optional sensors (such as an electronic, a biological or a chemical sensor) that that provide sensor data that measure or specify the given environmental condition(s). In these embodiments, product tag 130 may respond to the sensor data. For example, the circuit in integrated circuit 134 may activate the given functional ink based at least in part on the sensor data, such as by outputting or providing a given voltage. Alternatively or additionally, the given state of the circuit may be in response to sensor data from the sensor.

Note that the environmental condition may include: a lighting condition (such as a lighting color or wavelength), a light intensity, temperature, humidity, a vibration level, a pollution level, an altitude, a location, a time (such as an elapsed time relative to an expiration date of the product), a noise level, a presence or absence of a biological material (such as a particular DNA sequence, an RNA sequence, a protein, blood, a tissue, etc.), an organic material (such as wood, particulate, biomass, etc.), an inorganic material (such as a metal, a mineral, a non-metallic element, silicon, oxygen, water, etc.), a magnetic material, a magnetic field and/or another environmental condition.

In some embodiments, the environmental condition includes an RF signal that is received by the sensor or the circuit. For example, the RF signal may specify or indicate a code or an identifier associated with product tag 130 and/or product 132. Alternatively or additionally, the RF signal may be associated with a carrier frequency and/or may be compatible with a communication protocol (such as Bluetooth low energy or BLE). Moreover, the circuit may provide a voltage that results in the presentation of the given location information based at least in part on the RF signal. For example, when the RF signal is received by the sensor or the circuit, a resulting current in the circuit may cause the voltage to be provided.

Note that product tag 130 may specify an identifier, such as an identifier that includes or is compatible with one or more of: a global standards 1 (GS1) digital link, a global trade item number (GTIN), a serial shipping container (SSCC), a serialized global trade item number (SGTIN), an European article number code (EAN), a universal product codes (UPC), an electronic product code (EPC), a global location number (GLN), an international standard book identifier (ISBN), a global returnable assess identifier (GRAI), a global coupon number (GCN), an Amazon standard identification number (ASIN), a global returnable asset identifier (GRAI), a global shipment identification number (GSIN), a universally unique identifier (UUID), a global document type identifier (GDTY), a globally unique identifier (GUID), an Eddystone unique identity number (UID) or enrollment number (EID), an international mobile equipment identity (IMEI), an embedded subscriber identity module (eSIM) identifier, a pharmaceutical product identifier (PhPID), a serial number, or another identifier.

Moreover, in some embodiments, these features or capabilities of product tag 130 may allow a user or a consumer to receive dynamic content or product information. Notably, an electronic device (such as electronic device 110) may obtain information that specifies product tag 130. For example, electronic device 110 may scan or acquire an image of product tag 130 using an image senor (such as a CMOS or CCD image sensor) in electronic device. Alternatively, scanning device 136 may scan or acquire the image of product tag 130, and may provide the information specifying product tag 130 to electronic device 110.

Then, electronic device 110 may use the currently presented location information in product tag 130 (which may be based at least in part on the current environmental condition(s)) to obtain a document location. For example, electronic device 110 may analyze an image of product tag 130 using an image processing technique (e.g., by performing feature extraction or using a neural network) to obtain the document location from the location information. For example, the extracted features may include: edges, corners, lines, conic shapes, color regions, texture, and/or text. In some embodiments, the features are extracted using a description technique, such as: scale invariant feature transform (SIFT), speed-up robust features (SURF), a binary descriptor (such as ORB), binary robust invariant scalable keypoints (BRISK), fast retinal keypoint (FREAK), etc. Alternatively or additionally, the image analysis may involve one or more supervised or machine-learning techniques to extract authenticity features, such as: support vector machines, classification and regression trees, logistic regression, LASSO, linear regression, another (linear or nonlinear) supervised-learning technique, and/or a neural network (such as a convolutional neural network). Note that the document location may identify product 132, either uniquely or at a level of a stock-keeping unit (or a group of products).

Next, electronic device 110 may provide a message (such as a packet or a frame) with the location information to computer 122 via network 124. In response, computer 122 may provide content or product information to electronic device 110. In some embodiments, computer 122 may extract information about one or more environmental conditions that is included in or specified by the document location, and may use this information to select, access or generate the content or product information. Moreover, electronic device 110 may present the content or product information to a consumer or a user. For example, electronic device 110 may display the content or product information on a display and/or may output sound corresponding to the content or product information (such as using a speaker).

Note that the location information may include one or more messages (such as a warning message or notification, e.g., recall information and/or expiration information). Electronic device 110 may provide the one or more messages to the consumer or the user. For example, electronic device 110 may display the one or more messages on a display and/or may output sound corresponding to the one or more messages.

In some embodiments, instead of the content or product information, computer 122 may provide instruction for an RF signal to electronic device 110 in response to the message. Then, in response to the instruction, electronic device 110 may provide or transmit the RF signal to product tag 130. This RF signal may change product tag 130, such that second location information that specifies a second document location associated with product 132 is presented. Next, electronic device 110 may obtain second information that specifies that specifies modified product tag 130. For example, electronic device 110 may scan or acquire a second image of modified product tag 130 using the image senor (such as a CMOS or CCD image sensor, a barcode scanner or a scanner device) in electronic device. Alternatively, scanning device may scan or acquire the second image of product tag 130, and may provide the information specifying modified product tag 130 to electronic device 110.

Then, electronic device 110 may use the currently presented location information in modified product tag 130 (which may be based at least in part on the current environmental condition(s), such as the presence of the RF signal) to obtain the second document location. For example, electronic device 110 may analyze the second image of modified product tag 130 using the image processing technique (e.g., by performing feature extraction or using a neural network) to obtain the second document location from the second location information.

Next, electronic device 110 may provide a second message (such as a packet or a frame) with the second location information to computer 122 via network 124. In response, computer 122 may provide second content or product information to electronic device 110. Moreover, electronic device 110 may present the second content or product information to the consumer or the user. For example, electronic device 110 may display the second content or product information on a display and/or may output sound corresponding to the second content or product information.

In some embodiments, where the information specifying product tag 130 is obtained by electronic device 110 from a separate scanning device 136, computer 122 may provide the instruction specifying the RF signal to scanning device 136. In response to the instruction, scanning device 136 may provide or transmit the RF signal that modifies product tag 130 instead of electronic device 110.

Furthermore, in some embodiments, computer 120 may generate product tag 130 (or information specifying product tag 130). Notably, computer 120 may obtain information specifying multiple document locations associated with product 132 based at least in part on different environmental conditions of product 132. For example, computer 120 may access the information, which may be stored in memory.

Then, computer 120 may generate product tag 130, where product tag 130 includes location information specifying the document locations, given location information is associated with a given functional ink or is associated with at least a given state of a circuit in product tag 130 that is responsive to a given environmental condition (and, more generally, one or more conditions that can activate or change product tag 130), and the environmental conditions for different functional inks or different states of the circuit are different, such that, at a given time, product tag 130 presents location information for a given one of the document locations. In some embodiments, the product tag includes an identifier for the product tag or an instance of the product. By changing the identifier, a new product tag or a different instance of the product may be specified.

Note that generating product tag 130 may include specifying a layout of product tag 130, including one or more layers or interleaved or interdigitated patterns corresponding to the location information. The one or more layers or interleaved or interdigitated patterns may include with functional inks having different properties (such as functional inks that are responsive to different environmental condition(s)), wiring associated with the sensor and/or circuit, the sensor and/or the circuit. Moreover, generating product tag 130 may include selecting the location information based at least in part on: capabilities of the functional inks (such as environmental responses of the functional inks), possible sensor data provided by the sensor, the states of the circuit, and/or a type of electronic device that interacts with (such as scans, images or reads out) product tag 130.

Next, computer 120 may provide information specifying product tag 130 to another electronic device (not shown), such as a printer, that prints product tag 130.

In these ways, the product-information techniques may provide dynamic product tags that are responsive to changes in environmental conditions (which may include one or more transmitted RF signals). A product tag may respond to a change in one or more environmental conditions directly (such as based at least in part on function ink having associated properties or characteristics that respond to one or more environmental conditions) or indirectly, such as in response to sensor data from one or more sensors and/or to the presence (or absence) of one or more RF signals.

Moreover, while the preceding discussion illustrated computer 120 and computer 122 (which may be remote from electronic device 110) performing at least a portion of the product-information techniques, in other embodiments one or more of the operations performed by computer 120 and/or computer 122 are performed locally (e.g., by a computer that is proximate to electronic device 110 or by electronic device 110).

Figure 2:
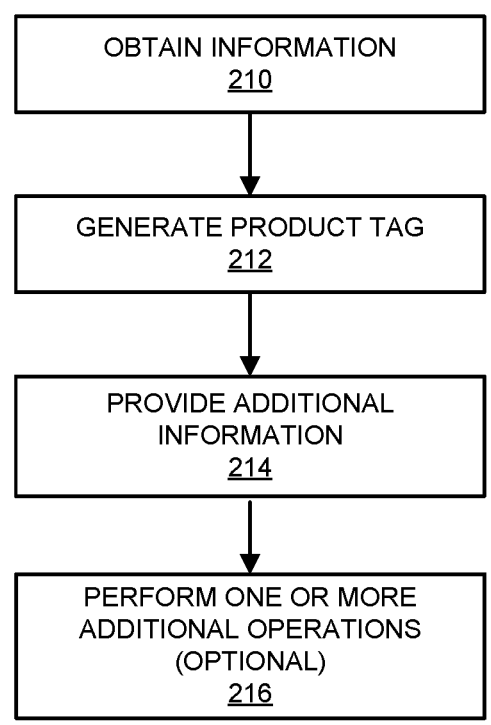
FIG. 2 is a flow diagram illustrating an example of a method for generating a product tag for a product using a computer in FIG. 1 in accordance with an embodiment of the present disclosure.

We now describe embodiments of a method. FIG. 2 presents a flow diagram illustrating an example of a method 200 for generating a product tag for a product using a computer, such as computer 120 (FIG. 1). During operation, the computer may obtain information (operation 210) specifying multiple document locations associated with the product based at least in part on different environmental conditions of the product. Note that the document locations may correspond to documents (such as web pages or websites). Alternatively or additionally, the document locations may include one or more URLs and/or one or more URIs. In some embodiments, the document locations may identify the product, either uniquely or at a level of a stock-keeping unit.

Then, the computer may generate the product tag (operation 212), where the product tag may include location information specifying the document locations. Moreover, given location information may be associated with a given functional ink or may be associated with a given state of a circuit in the product tag that is responsive to a given environmental condition. Furthermore, the environmental conditions for different functional inks or different states of the circuit may be different, such that, at a given time, the product tag presents location information for a given one of the document locations.

Note that the location information may include barcodes, such as two-dimensional (2D) barcodes. For example, the 2D barcodes may include Quick Response or QR codes. Moreover, presenting location information for the given one of the document locations may include that the location information for the given one of the document locations is visible, while location information for a remainder of the document locations are not visible. In some embodiments, the location information may include one or more messages.

Next, the computer may provide additional information (operation 214) specifying the product tag to the electronic device.

In some embodiments, the computer may optionally perform one or more additional operations (operation 216). For example, when generating the product tag (operation 212), the computer may select the location information based at least in part on capabilities of the functional inks (such as environmental responses of the functional inks) and/or the states of the circuit.

Moreover, obtaining the information (operation 210) may involve accessing the information, which is stored in the memory.

Furthermore, in some embodiments, the given functional ink responds to sensor data from a sensor associated with the product or the product tag that specifies the given environmental condition. For example, the product tag may include the sensor that provides the sensor data based at least in part on the given environmental condition and the circuit may activate the given functional ink based at least in part on the sensor data. Alternatively or additionally, the given state of the circuit may be in response to sensor data from the sensor associated with the product or the product tag that specifies the given environmental condition.

Note that the environmental condition may include one or more of: a lighting condition, a light intensity, temperature, humidity, a vibration level, a pollution level, an altitude, a location, a time (such as an elapsed time relative to an expiration date of the product), a noise level, a presence or absence of a biological material (such as a DNA sequence, an RNA sequence, a protein, blood, a tissue, etc.), an organic material (such as wood, particulate, biomass, etc.), an inorganic material (such as a metal, a mineral, a non-metallic element, silicon, oxygen, water, etc.), a magnetic material, a magnetic field and/or another environmental condition.

In some embodiments, the environmental condition includes a radio-frequency (RF) signal that is received by the sensor or the circuit. This RF signal may include one or more frequencies and/or may be encoded (and, thus, may be an RF signature that specifically activates the product tag). For example, the RF signal may specify or indicate a code or an identifier associated with the product tag and/or the product. Alternatively or additionally, the RF signal may be associated with a carrier frequency and/or may be compatible with a communication protocol (such as Bluetooth low energy). Moreover, the circuit may provide a voltage that results in the presentation of the given location information based at least in part on the RF signal. For example, when the RF signal is received by the sensor or the circuit, a current in the circuit may cause the voltage to be provided. Thus, in some embodiments, the product tag may harvest energy from the RF signal. However, in other embodiments, the RF signal is targeted to or specific to a desired change in the product tag.

Figure 3:
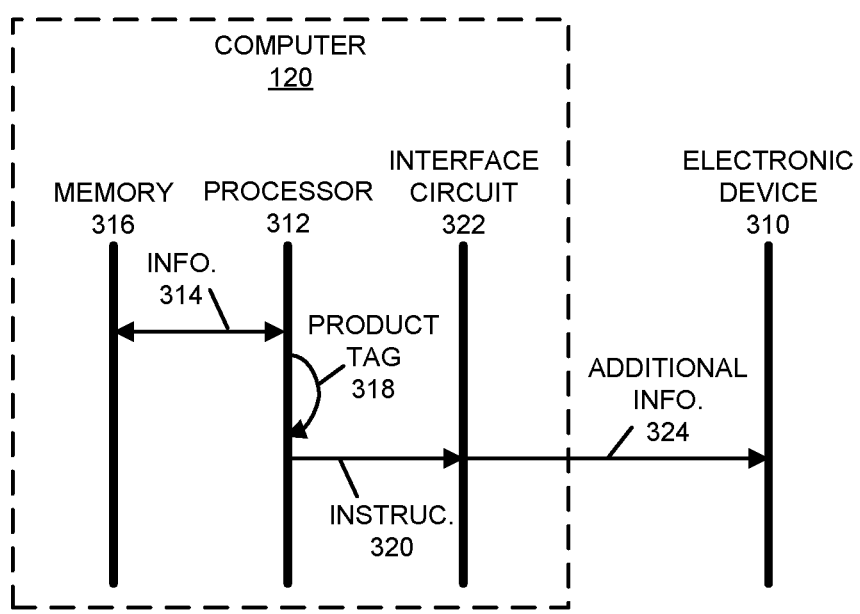
FIG. 3 is a drawing illustrating an example of communication among electronic devices in FIG. 1 in accordance with an embodiment of the present disclosure.

FIG. 3 presents a drawing illustrating an example of communication among computer 120 and electronic device 310 (such as a printer). During operation, processor 312 in computer 120 (which may be executing program instructions) accesses stored information 314 in memory 316 in computer 120. This information may specify multiple document locations associated with a product based at least in part on different environmental conditions of the product.

Then, processor 312 may generate a product tag 318 (or information specifying product tag 318), where product tag 318 may include location information specifying the document locations. Moreover, given location information may be associated with a given functional ink or may be associated with a given state of a circuit in product tag 318 that is responsive to a given environmental condition. Furthermore, the environmental conditions for different functional inks or different states of the circuit may be different, such that, at a given time, product tag 318 presents location information for a given one of the document locations. For example, depending on the environmental condition(s), the location information for the given one of the document locations may be visible, while a remainder of the document locations may not be visible.

Next, processor 312 may instruct 320 interface circuit 322 in computer 120 to provide additional information 324 specifying product tag 318 to electronic device 310. In response, interface circuit 322 may provide additional information 324 to electronic device 310. Using additional information 324, electronic device 310 may print or fabricate product tag 318.

While FIG. 3 illustrates communication between components using unidirectional or bidirectional communication with lines having single arrows or double arrows, in general the communication in a given operation in these figures may involve unidirectional or bidirectional communication.

Figure 4:
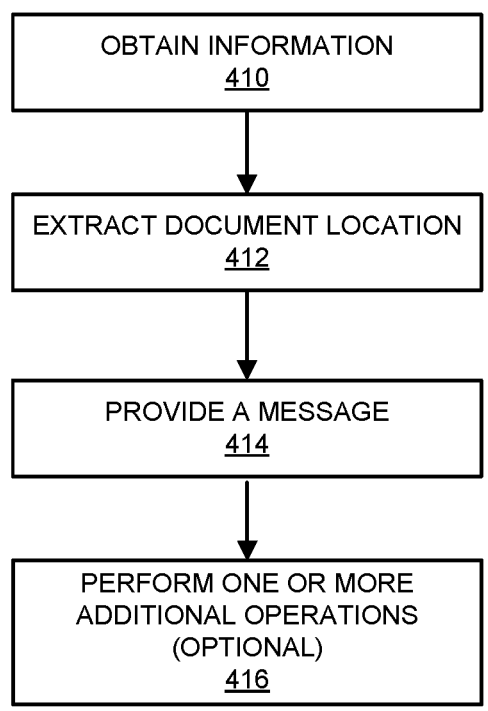
FIG. 4 is a flow diagram illustrating an example of a method for obtaining product information associated with a product using a computer FIG. 1 in accordance with an embodiment of the present disclosure.

FIG. 4 presents a flow diagram illustrating an example of a method 400 for obtaining product information associated with a product using an electronic device, such as electronic device 110 (FIG. 1). During operation, the electronic device may obtain information (operation 410) that specifies a product tag for the product. This information may include location information that specifies a document location associated with the product.

Then, the electronic device may extract the document location (operation 412) from the information, and may provide a message (operation 414) that specifies the document location to a computer via a network.

In some embodiments, the electronic device may optionally perform one or more additional operations (operation 416). For example, the location information may be based at least in part on an environmental condition of the product. Moreover, in response to the message, the electronic device may receive the product information (and, more generally, content) associated with the product and the environmental condition from the computer. Furthermore, the electronic device may present the product information.

Alternatively or additionally, in response to the message, the electronic device may receive an instruction specifying an RF signal from the computer. Then, the electronic device may provide or transmit the RF signal to the product tag in response to the instruction. This RF signal may change the product tag, such that second location information that specifies a second document location associated with the product is presented or is visible. Next, the electronic device may obtain second information that specifies the product tag for the product. This second information may include the second location information that specifies the second document location associated with the product. Then, the electronic device may extract the second document location from the second information, and may provide a second message that specifies the second document location to the computer via the network.

Note that, in some embodiments, where the image and/or the second image are obtained by the electronic device from a separate scanning device, the instruction specifying the RF signal may be provided to the scanning device by the computer. In response to the instruction, the scanning device may provide the RF signal to the product tag instead of the electronic device.

In some embodiments of methods 200 (FIG. 2) and/or 400, there may be additional or fewer operations. Furthermore, the order of the operations may be changed, there may be different operations and/or two or more operations may be combined into a single operation.

Figure 5:
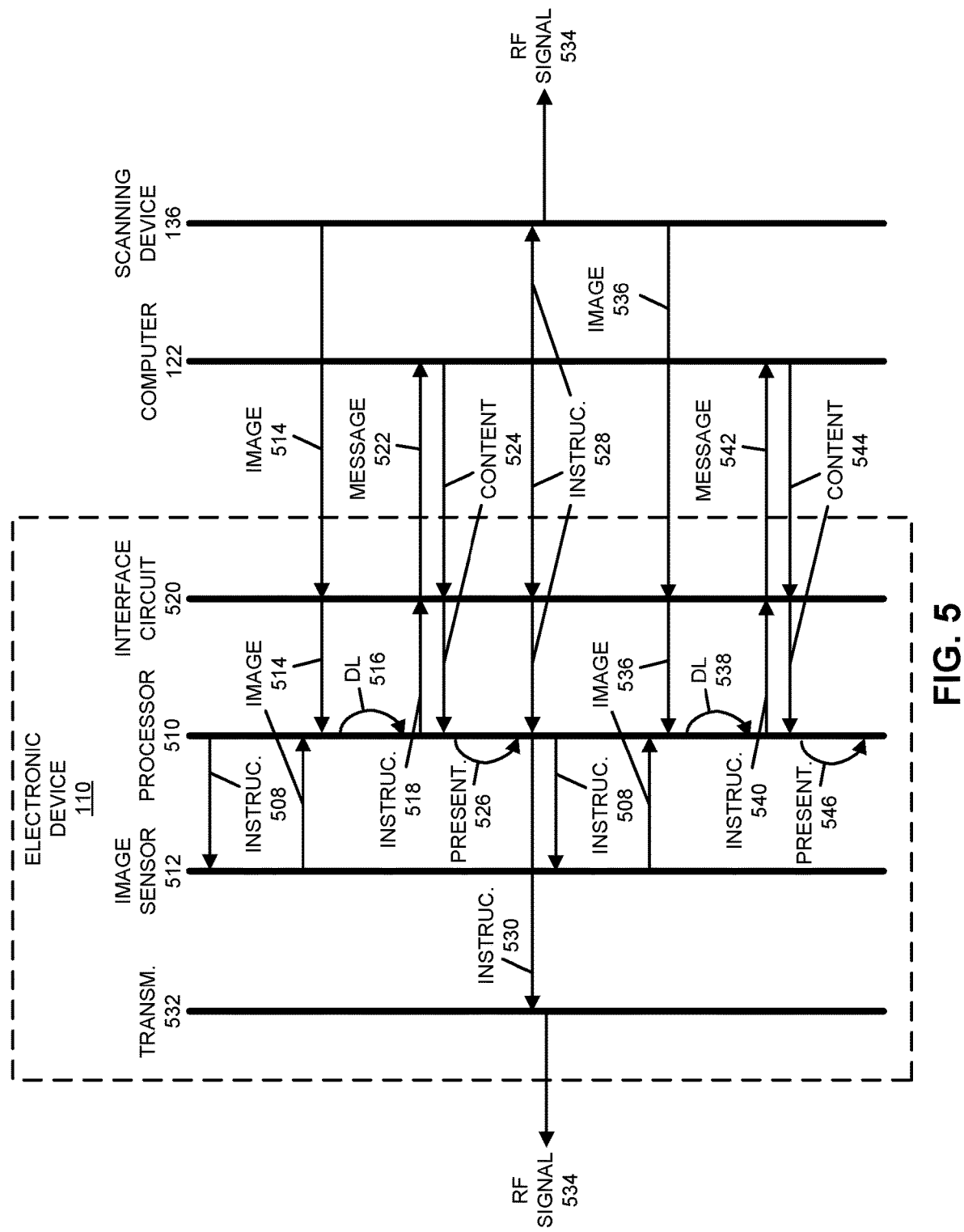
FIG. 5 is a drawing illustrating an example of communication among electronic devices in FIG. 1 in accordance with an embodiment of the present disclosure.

FIG. 5 presents a drawing illustrating an example of communication among electronic device 110, computer 122 and scanning device 136. During operation, processor 510 in electronic device 110 (which may be executing program instructions) instructs 508 image sensor 512 in electronic device 110 to obtain an image 514 that specifies a product tag for a product. This image may include location information that specifies a document location associated with the product. Alternatively, scanning device 136 may provide image 514 to electronic device 110. After receiving image 514, an interface circuit 520 in electronic device 110 may provide image 514 to processor 510.

Then, processor 510 may analyze image 514 to extract or obtain document location (DL) 516, and may instruct 518 interface circuit 520 to provide a message 522 that specifies document location 516 to computer 122.

In response to message 522, computer 122 may provide product information (and, more generally, content 524) associated with the product and an environmental condition of the product to electronic device 110. After receiving content 524, interface circuit 520 may provide content 524 to processor 510, which may present 526 content 524 (e.g., using a display and/or a speaker).

In some embodiments, in response to message 522, computer 122 may provide an instruction 528 specifying an RF signal 534 to electronic device 110 or scanning device 136. After receiving instruction 528, interface circuit 520 may provide instruction 528 to processor 510, which instructs 530 a transmitter 532 in electronic device 110 to transmit RF signal 534. Alternatively, after receiving instruction 528, scanning device 136 may transmit RF signal 534. RF signal 534 may change or modify the product tag, such that second location information that specifies a document location 538 associated with the product is presented or is visible.

Next, processor 510 instructs 508 image sensor 512 to obtain an image 536 that specifies the modified product tag for the product. This image may include the second location information that specifies document location 538 associated with the product. Alternatively, scanning device 136 may provide image 536 to electronic device 110. After receiving image 514, interface circuit 520 may provide image 536 to processor 510.

Then, processor 510 may analyze image 536 to extract or obtain document location 538, and may instruct 540 interface circuit 520 to provide a message 542 that specifies document location 538 to computer 122.

In response to message 542, computer 122 may provide product information (and, more generally, content 544) associated with the product and/or an environmental condition of the product to electronic device 110. After receiving content 544, interface circuit 520 may provide content 544 to processor 510, which may present 546 content 544 (e.g., using a display and/or a speaker).

While FIG. 5 illustrates communication between components using unidirectional or bidirectional communication with lines having single arrows or double arrows, in general the communication in a given operation in these figures may involve unidirectional or bidirectional communication.

We now further describe embodiments of the product-information techniques. When generating a product tag, a computer may use a states generation technique (SGT). For example, the computer may generate or select a URI or URL. Then, based on a number of possible environmental conditions and/or values of sensory data, the computer may generate or select URIs and/or URLs corresponding to the possible environmental conditions and/or the values of sensory data. Moreover, the computer may generate 2D barcodes that encode the URIs and/or URLs by adding or removing data pixels (which are sometimes referred to as 'data modules') while ensuring the 2D barcodes are valid. Note that a 'data module' may refer to a pattern (such as one or more black and white shapes) that make up or are included in a 2D barcode, such as a QR Code or Data Matrix code.

Based at least in part on the generated product tag, an electronic device (such as a printer) may use functional inks, one or more circuits and/or one or more sensors to fabricate the product tag. When the product tag is exposed to particular change in one or more environmental conditions (or an environmental state), one or more data modules may appear or disappear in the fabricated product tag, thereby changing the corresponding specified URI or URL. Note that one or more portions of the location information represented by the 2D barcode may be changed as a result of changes in one or more environmental conditions. These changes in the 2D barcode may change the corresponding specified document location (such as a URI or URL query parameter), thereby allowing the product tag to dynamically specify different documents (such as web pages or websites) or web services or applications based at least in part on changes in the one or more environmental conditions. Table 1 provides pseudocode for the SGT.

TABLE 1

Given Sn, a set of all possible URIs or URLs for supported environmental states of an environmentally sensitive product tag:
    Create a 2D barcode that contains the initial state So of a URI or URL;
    Then, for each environmental state Sx in Sn:
        Find a 2D barcode that matches a target URI or URL L for Sx by adding or removing data modules from the 2D barcode;
        For each Sy ≠ Sx of the possible environmental states in Sn:
            Ensure that Sy combined with the other environmental states in Sn is a valid 2D barcode.
Note that the choice to add or remove data modules may depend on the capabilities of the product tag (such as whether a functional ink appears or disappears under a certain environmental state).

In response to receiving a URI or a URL specified by a product tag, a cloud-based computer or server may extract a variable part of the URI or URL that specifies the environmental condition(s) or state. Using this information, the cloud-based computer or server may access stored product information (or content) and/or may contextualize or customize the product information (or content) based at least in part on the environmental condition(s) of the product.

Figure 6:
FIG. 6 is a drawing illustrating an example of dynamic location information in accordance with an embodiment of the present disclosure.

FIG. 6 presents a drawing illustrating an example of dynamic location information 610. This location information may include data modules 612. Moreover, data modules 612 may specify a QR code corresponding to a URI or URL.

Figure 7:
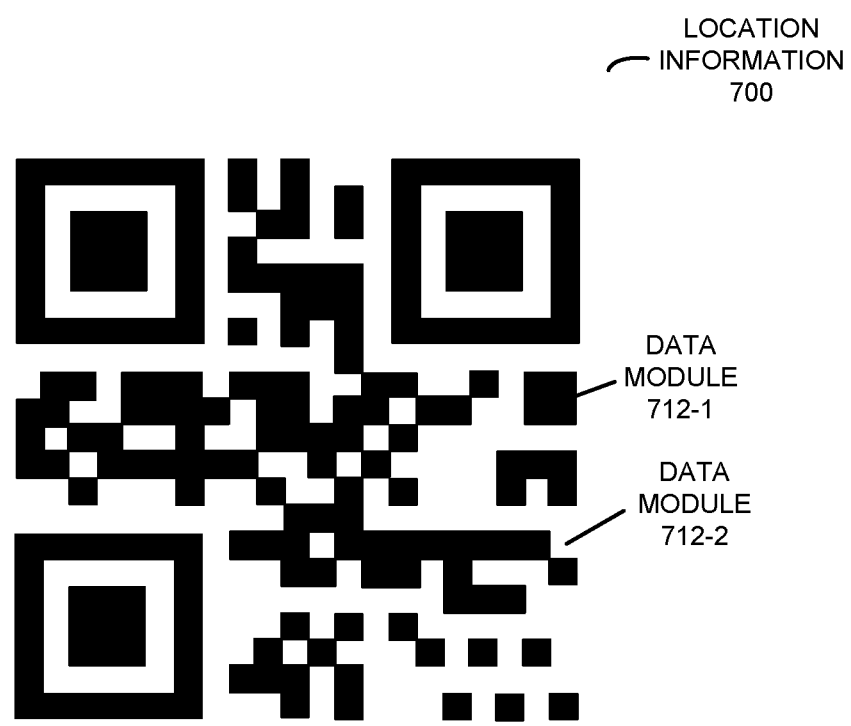
FIG. 7 is a drawing illustrating an example of dynamic location information in accordance with an embodiment of the present disclosure.

Variations in one or more environmental conditions may result in a different (distinct) QR code being visible in a product tag. This is shown in FIG. 7, which presents a drawing illustrating an example of dynamic location information 710. This location information may include data modules 712. Moreover, data modules 712 may specify a different QR code corresponding to a different URI or URL than location information 610. More generally, location information 610 or 710 may specify different web services, different locations on in memory, or different parameters for a common web service. As discussed previously, a transformation from location information 610 to location information 710 may be in response to a change in one or more environmental conditions. For example, a product tag may encode or represent location information 610 and location information 710 using functional inks that have one or more different physical properties (such as different optical or electrical properties) as one or more environmental conditions change. Note that, in some embodiments, there may be at least partial overlap between data modules 612 and 712. Alternatively, in some embodiments data modules 612 and 712 may not overlap (i.e., none of data modules 612 may be used to encode location information 710 and none of data modules 712 may be used to encode location information 610).

In some embodiments, a product has an expiration date of 10 days. After 10 days, at least a portion of the functional ink in a product tag may disappear or may decay changing the specified URI or URL. This change may indicate that this product should no longer be consumed or eaten. For example, the product information or content returned in response to a message that includes the specified URI or URL may indicate that the product has expired and should no longer be eaten or consumed.

Moreover, in some embodiments, a product tag may be used to specify a product or a set of products. When scanned, the location information in the product tag may specify a document location (such as a URL or URI). This document location a computer that hosts a web page or a website. In response to a message with the URL or URI, the computer may return an instruction to transmit an RF signal. This RF signal may change the product tag, so that modified location information in the product tag specifies a different document location. Note that the RF signal may be generic (e.g., the product tag may harvest the RF energy, and the harvested RF energy may be used, such as by a circuit, to change the product tag) or may be specific (such as BLE-compatible RF signal that is intended for the product tag, e.g., the RF signal may include a code or an identifier of the product tag, which, when received by the circuit in the product tag, may result in the product tag changing).

Notably, the product tag may a functional ink that is conductive and a circuit (such as a printed circuit in the product tag) that can harvest RF energy. When the RF signal is absent, the product tag may include initial visible location information that specifies an initial document location. Then, when the RF signal is present, the circuit (via an antenna) may harvest the RF energy. In response, at least a portion of the location information may be changed (e.g., into a different 2D barcode), thereby specifying a different document location. For example, when activated by the harvested RF energy, the circuit may output a voltage (or a current) that converts one or more data modules from white to black and one or more other data modules from black to white.

Alternatively, when a specific RF signal is present (such as a BLE-compatible RF signal that designates the product tag and/or that has a particular carrier frequency or a particular range of frequencies), the circuit may be activated and the visible location information in the product tag may change. For example, the RF signal may include or may specify a code or an identifier of the circuit (such as an encoded sequence of binary pulses, e.g., using pulse code modulation, pulse width modulation, binary coded modulation, amplitude shift keying, phase shift keying, frequency shift keying, etc.). When the RF signal includes or specifies a different code or identifier, the RF signal may not activate the circuit and, thus, may not change the visible location information. Thus, in these embodiments, a mapping between the internal code or identifier and the product tag (or the product) needs to be predetermined or predefined and stored, so that an instruction can be provided to, e.g., the electronic device or the scanning device, to transmit the appropriate RF signal.

In some embodiments, when a product, such as a shirt, is authentic, the modified product tag in the presence of the RF signal may direct a user or a consumer to a URI or URL. In contrast, when the product is not authentic, the RF signal may not result in a modified product tag that directs the user or the consumer to the URI or URL. Thus, these embodiments of the product-information technique may be used for product authentication.

Figure 8:
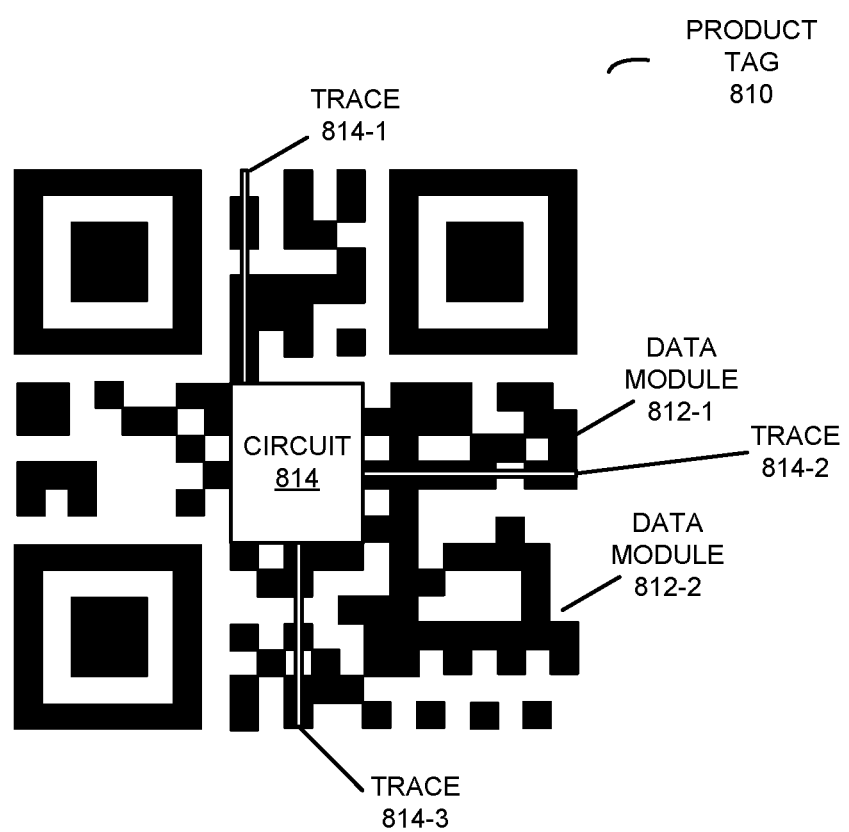
FIG. 8 is a drawing illustrating an example of a dynamic product tag in accordance with an embodiment of the present disclosure.

FIG. 8 presents a drawing illustrating an example of a dynamic product tag 810. Notably, product tag 810 may initially have visible location information that is represented by data modules 812. For example, data modules 812 may specify a QR code corresponding to a URI or URL. Moreover, product tag 810 may include a circuit 814 and wires or traces 816.

Figure 9:
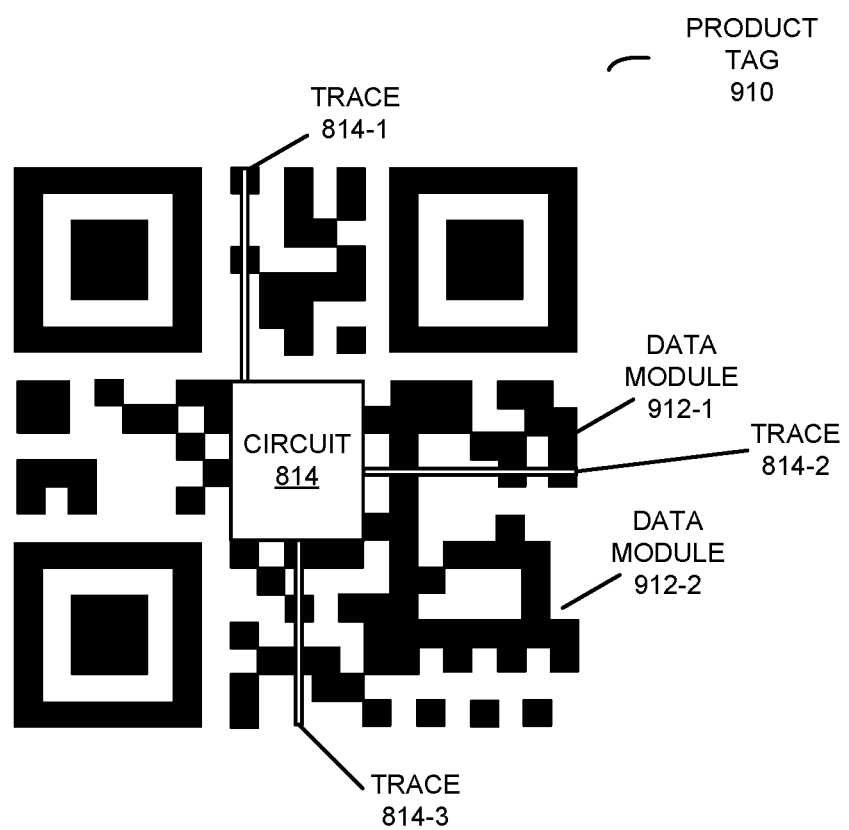
FIG. 9 is a drawing illustrating an example of a dynamic product tag in accordance with an embodiment of the present disclosure.

In the presence of a suitable RF signal, circuit 814 may activate and may output a voltage (or a current) that changes the visible location information. This is shown in FIG. 9, which presents a drawing illustrating an example of a dynamic product tag 910. Notably, product tag 910 may have visible location information that is represented by data modules 912. For example, data modules 912 may specify a QR code corresponding to a URI or URL that is different from that in product tag 810 (FIG. 8).

In some embodiments, an environmental condition may be triggered by a product tag. For example, the initial location information in a product tag may provide or specify a document location (such as a URI or URL). In response to a message addressed to the URI or the URL, a computer may provide a challenge message with an instruction to a user or consumer's electronic device or a scanning device to provide an RF signal. Then, the electronic device or the scanning device may provide or transmit the RF signal. This RF signal may modify the product tag, so that it specifies a different URI or URL. Next, the electronic device may provide a second message addressed to the different URI or URL.

We now describe embodiments of an electronic device, which may perform at least some of the operations in the product-information techniques. FIG. 10 presents a block diagram illustrating an example of an electronic device 1000 in accordance with some embodiments, such as electronic device 110, electronic device 112, access point 114, base station 116, computer 120, computer 122 etc. This electronic device includes processing subsystem 1010, memory subsystem 1012, and networking subsystem 1014. Processing subsystem 1010 includes one or more devices configured to perform computational operations. For example, processing subsystem 1010 can include one or more microprocessors, ASICs, microcontrollers, programmable-logic devices, one or more graphics process units (GPUs) and/or one or more digital signal processors (DSPs).

Memory subsystem 1012 includes one or more devices for storing data and/or instructions for processing subsystem 1010 and networking subsystem 1014. For example, memory subsystem 1012 can include dynamic random access memory (DRAM), static random access memory (SRAM), and/or other types of memory. In some embodiments, instructions for processing subsystem 1010 in memory subsystem 1012 include: one or more program modules or sets of instructions (such as program instructions 1022 or operating system 1024), which may be executed by processing subsystem 1010. Note that the one or more computer programs may constitute a computer-program mechanism. Moreover, instructions in the various modules in memory subsystem 1012 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1010.

In addition, memory subsystem 1012 can include mechanisms for controlling access to the memory. In some embodiments, memory subsystem 1012 includes a memory hierarchy that comprises one or more caches coupled to a memory in electronic device 1000. In some of these embodiments, one or more of the caches is located in processing subsystem 1010.

In some embodiments, memory subsystem 1012 is coupled to one or more high-capacity mass-storage devices (not shown). For example, memory subsystem 1012 can be coupled to a magnetic or optical drive, a solid-state drive, or another type of mass-storage device. In these embodiments, memory subsystem 1012 can be used by electronic device 1000 as fast-access storage for often-used data, while the mass-storage device is used to store less frequently used data.

Networking subsystem 1014 includes one or more devices configured to couple to and communicate on a wired and/or wireless network (i.e., to perform network operations), including: control logic 1016, an interface circuit 1018 and one or more antennas 1020 (or antenna elements) and/or input/output (I/O) port 1030. (While FIG. 10 includes one or more antennas 1020, in some embodiments electronic device 1000 includes one or more nodes, such as nodes 1008, e.g., a network node that can be coupled or connected to a network or link, or an antenna node or a pad that can be coupled to the one or more antennas 1020. Thus, electronic device 1000 may or may not include the one or more antennas 1020.) For example, networking subsystem 1014 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Networking subsystem 1014 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1000 may use the mechanisms in networking subsystem 1014 for performing simple wireless communication between the electronic devices, e.g., transmitting advertising or beacon frames and/or scanning for advertising frames transmitted by other electronic devices as described previously.

Within electronic device 1000, processing subsystem 1010, memory subsystem 1012, and networking subsystem 1014 are coupled together using bus 1028. Bus 1028 may include an electrical, optical, and/or electro-optical connection that the subsystems can use to communicate commands and data among one another. Although only one bus 1028 is shown for clarity, different embodiments can include a different number or configuration of electrical, optical, and/or electro-optical connections among the subsystems.

In some embodiments, electronic device 1000 includes a display subsystem 1026 for displaying information on a display, which may include a display driver and the display, such as a liquid-crystal display, a multi-touch touchscreen, etc.

Electronic device 1000 can be (or can be included in) any electronic device with at least one network interface. For example, electronic device 1000 can be (or can be included in): a computer system (such as a cloud-based computer system or a distributed computer system), a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a computer network device, a stack of computer network devices, an access point, a controller, test equipment, and/or another electronic device.

Although specific components are used to describe electronic device 1000, in alternative embodiments, different components and/or subsystems may be present in electronic device 1000. For example, electronic device 1000 may include one or more additional processing subsystems, memory subsystems, networking subsystems, and/or display subsystems. Additionally, one or more of the subsystems may not be present in electronic device 1000. Moreover, in some embodiments, electronic device 1000 may include one or more additional subsystems that are not shown in FIG. 10, such as a user-interface subsystem 1032. Also, although separate subsystems are shown in FIG. 10, in some embodiments some or all of a given subsystem or component can be integrated into one or more of the other subsystems or component(s) in electronic device 1000. For example, in some embodiments program instructions 1022 are included in operating system 1024 and/or control logic 1016 is included in interface circuit 1018.

Moreover, the circuits and components in electronic device 1000 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1014 (or, more generally, of electronic device 1000). The integrated circuit may include hardware and/or software mechanisms that are used for transmitting wireless signals from electronic device 1000 and receiving signals at electronic device 1000 from other electronic devices. Aside from the mechanisms herein described, radios are generally known in the art and hence are not described in detail. In general, networking subsystem 1014 and/or the integrated circuit can include any number of radios. Note that the radios in multiple-radio embodiments function in a similar way to the described single-radio embodiments.

In some embodiments, networking subsystem 1014 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Ethernet, a cellular-telephone communication protocol and a Wi-Fi communication protocol as an illustrative example, in other embodiments a wide variety of communication protocols and, more generally, wired and/or wireless communication techniques may be used. Thus, the product-information techniques may be used with a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the product-information techniques may be implemented using program instructions 1022, operating system 1024 (such as a driver for interface circuit 1018) or in firmware in interface circuit 1018. Alternatively or additionally, at least some of the operations in the product-information techniques may be implemented in a physical layer, such as hardware in interface circuit 1018.

While the preceding embodiments illustrated changes in an environmentally sensitive product tag, such as visible (or invisible) location information, in other embodiments the changes in one or more physical properties of a product tag may occur in a band of frequencies or wavelengths that includes one or more frequencies or wavelengths, and that is outside of the visible spectrum. For example, the change may occur in a band of frequencies in radio frequencies, an infrared band of frequencies, or an ultraviolet band of frequencies. Moreover, while the preceding embodiments illustrated the product-information techniques using optical changes in an environmentally sensitive product tag, in other embodiments one or more additional or different physical properties may change, such as electrical resistance. Therefore, in some embodiments, the product tag may be read out electrically instead of optically.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the product-information techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer, comprising:
   a network interface configured to communicate with an electronic device;
   a processor; and
   memory configured to store program instructions, wherein, when executed by the processor, the program instructions cause the computer to perform operations comprising:
   obtaining information specifying multiple document locations associated with a product based at least in part on different environmental conditions of the product;
   generating a product tag for the product, wherein the product tag comprises location information specifying the document locations, given location information is associated with at least a given functional ink or is associated with a given state of a circuit in the product tag that is configured to respond to a given environmental condition, and the environmental conditions for different functional inks or different states of the circuit are different, such that, at a given time, the product tag is configured to present location information for a given one of the document locations, and
   wherein generating the product tag comprises selecting the location information based at least in part on capabilities of the functional inks, the states of the circuit, or both; and
   providing additional information specifying the product tag to the electronic device.

2. The computer of claim 1, wherein the document locations comprise a uniform resource location (URL), a uniform resource identifier (URI), or both.

3. The computer of claim 1, wherein the location information comprises a one-dimensional (1D) barcode, a two-dimensional (2D) barcode, or a Quick Response (QR) code.

4. The computer of claim 1, wherein presenting location information for the given one of the document locations comprises that the location information for the given one of the document locations is visible, while location information for a remainder of the document locations are not visible.

5. The computer of claim 1, wherein obtaining the information comprises accessing the information in the memory.

6. The computer of claim 1, wherein the given functional ink is configured to respond to sensor data that specifies the given environmental condition.

7. The computer of claim 6, wherein the product tag comprises a sensor configured to provide the sensor data.

8. The computer of claim 7, wherein the circuit is configured to activate the given functional ink based at least in part on the sensor data.

9. The computer of claim 1, wherein the given state of the circuit is in response to sensor data from a sensor that specifies the given environmental condition.

10. The computer of claim 9, wherein the product tag comprises a sensor configured to provide the sensor data.

11. The computer of claim 1, wherein the environmental condition comprises one or more of: a lighting condition, a light intensity, temperature, humidity, a vibration level, a pollution level, an altitude, a location, an elapsed time relative to an expiration date of the product, a noise level, or a presence of a biological material.

12. The computer of claim 1, wherein the environmental condition comprises a presence of a radio-frequency (RF) signal.

13. The computer of claim 12, wherein the RF signal specifies an identifier associated with the product tag or the product.

14. The computer of claim 12, wherein the circuit is configured to provide a voltage that results in the presentation of the given location information based at least in part on the presence of the RF signal.

15. The computer of claim 1, wherein the location information comprises one or more messages.

16. The computer of claim 1, wherein one or more of the document locations identifies the product.

17. A non-transitory computer-readable storage medium for use in conjunction with a computer, the computer-readable storage medium storing program instructions that, when executed by the computer, cause the computer to perform operations comprising:
   obtaining information specifying multiple document locations associated with a product based at least in part on different environmental conditions of the product;
   generating a product tag for the product, wherein the product tag comprises location information specifying the document locations, given location information is associated with at least a given functional ink or is associated with a given state of a circuit in the product tag that is configured to respond to a given environmental condition, and the environmental conditions for different functional inks or different states of the circuit are different, such that, at a given time, the product tag is configured to present location information for a given one of the document locations, and
   wherein generating the product tag comprises selecting the location information based at least in part on capabilities of the functional inks, the states of the circuit, or both; and
   providing additional information specifying the product tag to the electronic device.

18. The non-transitory computer-readable storage medium of claim 17, wherein the given functional ink is configured to respond to sensor data that specifies the given environmental condition.

19. A method for generating a product tag for a product, comprising:
   by a computer:
   obtaining information specifying multiple document locations associated with the product based at least in part on different environmental conditions of the product;
   generating the product tag for the product, wherein the product tag comprises location information specifying the document locations, given location information is associated with at least a given functional ink or is associated with a given state of a circuit in the product tag that is configured to respond to a given environmental condition, and the environmental conditions for different functional inks or different states of the circuit are different, such that, at a given time, the product tag is configured to present location information for a given one of the document locations, and
   wherein generating the product tag comprises selecting the location information based at least in part on capabilities of the functional inks, the states of the circuit, or both; and
   providing additional information specifying the product tag to the electronic device.

20. The method of claim 19, presenting location information for the given one of the document locations comprises that the location information for the given one of the document locations is visible, while location information for a remainder of the document locations are not visible.

* * * * *